United States Patent
Hambarde

(10) Patent No.: US 12,350,965 B2
(45) Date of Patent: Jul. 8, 2025

(54) SYSTEMS AND METHODS FOR DISENGAGING WHEELS

(71) Applicant: DANA ITALIA S.R.L., Trentino (IT)

(72) Inventor: Rajesh Hambarde, Pune (IN)

(73) Assignee: DANA ITALIA S.R.L., Arco (IT)

( * ) Notice: Subject to any disclaimer, the term of this patent is extended or adjusted under 35 U.S.C. 154(b) by 326 days.

(21) Appl. No.: 18/057,557

(22) Filed: Nov. 21, 2022

(65) Prior Publication Data

US 2024/0166043 A1    May 23, 2024

(51) Int. Cl.
*B60B 3/14* (2006.01)
*B60B 27/00* (2006.01)
*B60B 27/06* (2006.01)
*B60B 37/04* (2006.01)

(52) U.S. Cl.
CPC ............ *B60B 3/14* (2013.01); *B60B 27/0015* (2013.01); *B60B 27/065* (2013.01); *B60B 37/04* (2013.01)

(58) Field of Classification Search
CPC ............ B60B 27/0015; B60B 27/0021; B60B 27/0026; B60B 27/06; B60B 27/065; B60B 37/04; B60B 37/06; B60B 37/10; B60B 3/14; B60B 3/142
See application file for complete search history.

(56) References Cited

U.S. PATENT DOCUMENTS

| | | | | |
|---|---|---|---|---|
| 3,635,303 | A | * | 1/1972 | Hetmann ................... B60B 3/14 180/370 |
| 4,591,211 | A | * | 5/1986 | Browning ............... B60B 3/142 301/35.52 |
| 7,922,258 | B2 | * | 4/2011 | Baumann .................. B60B 3/16 301/111.01 |
| 9,010,511 | B2 | | 4/2015 | Eastman |
| 9,834,038 | B2 | * | 12/2017 | Chung ................ B60B 27/0021 |
| 10,479,138 | B2 | * | 11/2019 | Christy ................... B60B 27/06 |
| 10,639,931 | B2 | * | 5/2020 | Price ....................... B60B 3/165 |
| 10,801,556 | B2 | | 10/2020 | Eschenburg et al. |
| 10,946,693 | B2 | * | 3/2021 | Baumann .................. B60B 3/18 |
| 11,105,380 | B2 | | 8/2021 | Kathman, Jr. et al. |
| 2023/0015494 | A1 | * | 1/2023 | Federici ............. B60B 27/0026 |
| 2023/0256818 | A1 | * | 8/2023 | Medeiros ............ B60B 27/0015 301/6.5 |

* cited by examiner

*Primary Examiner* — Jason R Bellinger
(74) *Attorney, Agent, or Firm* — McCoy Russell LLP

(57) ABSTRACT

Methods and systems are provided for coupling mechanism of a wheel. The coupling mechanism of a wheel includes a screw with a threaded portion, a block with an internal threaded portion, and a coupler mechanically coupled to the screw. The coupler has a radially inner surface configured to couple with a drive shaft and a radially outer surface configured to couple with a spindle, where the screw is configured to engage the coupler with the drive shaft when actuated in a first direction and disengage the coupler from the drive shaft when actuated in a second direction, opposite the first.

7 Claims, 12 Drawing Sheets

SYSTEMS AND METHODS FOR DISENGAGING WHEELS

TECHNICAL FIELD

The present description relates generally to systems and methods for disengaging an output shaft from a wheel, thereby disengaging the wheel from the main powertrain.

BACKGROUND AND SUMMARY

A drivetrain of a vehicle may be configured to deliver torque from the prime mover to one or more wheels of the vehicle. The prime mover may be an electric engine, gas or diesel powered engine, as a few examples. A rotating hub of a wheel of the one or more wheels may be coupled to a drive shaft of the vehicle or to a ring gear of a planetary reduction gear box. In some examples, it may be desired to decouple (e.g., disengage) one or more of the wheels from the drivetrain. For example, when towing a vehicle, it may be desirable to allow rear wheels and/or front wheels to rotate freely. In vehicles where the planetary reduction gear box (e.g., planetary gear box) is used to couple the drive shaft to the wheel hub, a coupling mechanism may include a helical spring and other small parts positioned on an input side of the planetary gear box.

However, the inventors herein have recognized issues with the above system including the coupling mechanism on the input side of the planetary gear box. If the planetary gear box includes a spindle or shaft output, the input side may be difficult to reach without disassembly. Additionally, access to the input side may also limited in vehicles including parallel shaft gear boxes driven by an electrical motor. In such examples, a coupling mechanism on an output side (e.g., a wheel side) may be demanded.

In one example, the issues described above may be at least partially addressed by a coupling mechanism of a wheel comprising; a screw with a threaded portion, a block with an internal threaded portion engaging the threaded portion of the screw, a coupler mechanically coupled to the screw, where the coupler has a inner surface configured radially to couple with a drive shaft and a radially outer surface configured to couple with a spindle, where the screw is configured to engage the coupler with the drive shaft when actuated in a first direction and disengage the coupler from the drive shaft when actuated in a second direction, opposite the first. In this way, wheels may be disengaged from the main driveline even in vehicles where an input side of the planetary gear box is not accessible.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
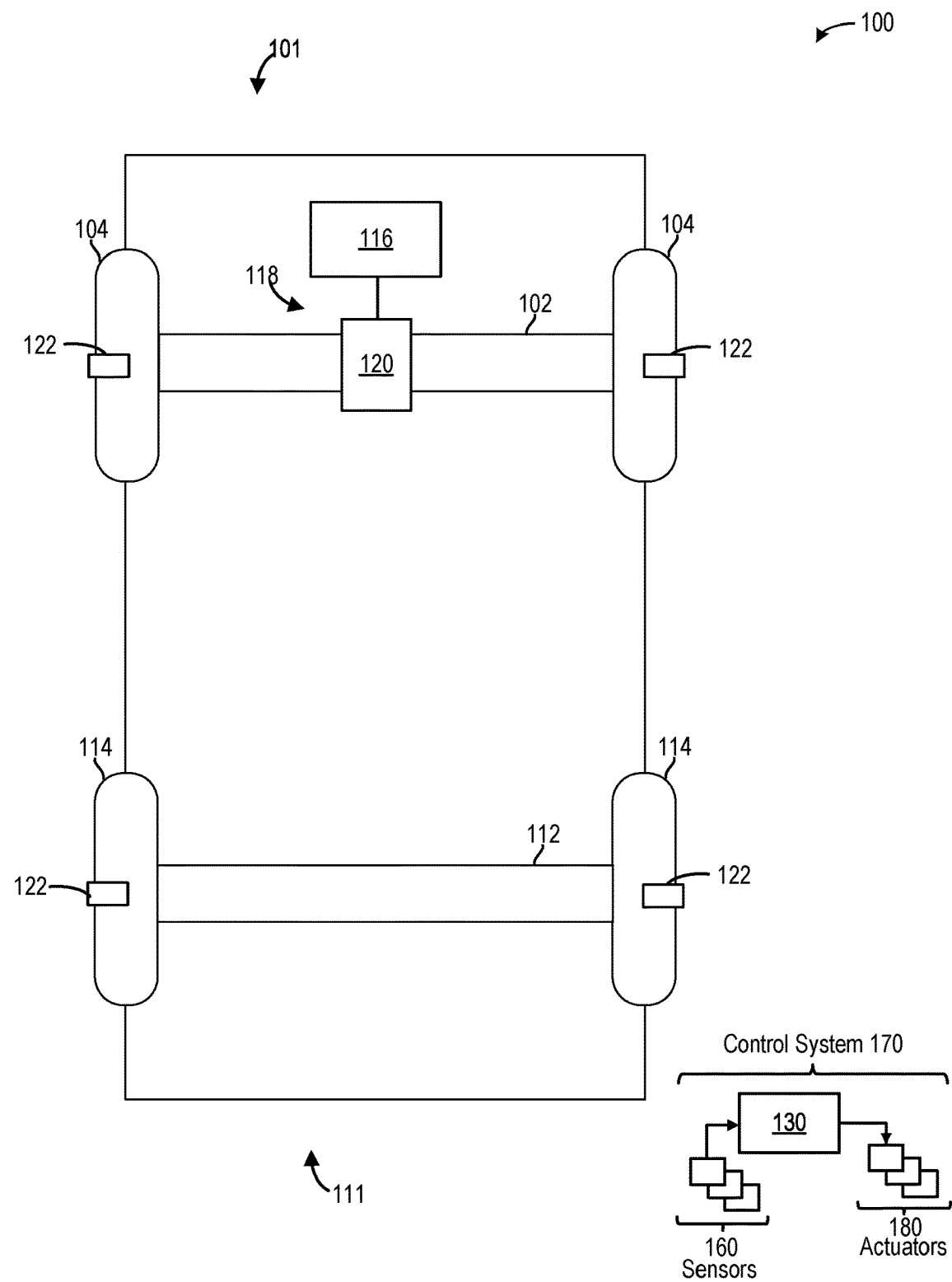
FIG. 1 shows a schematic of a vehicle comprising wheels coupled to drive shafts.
Figure 2:
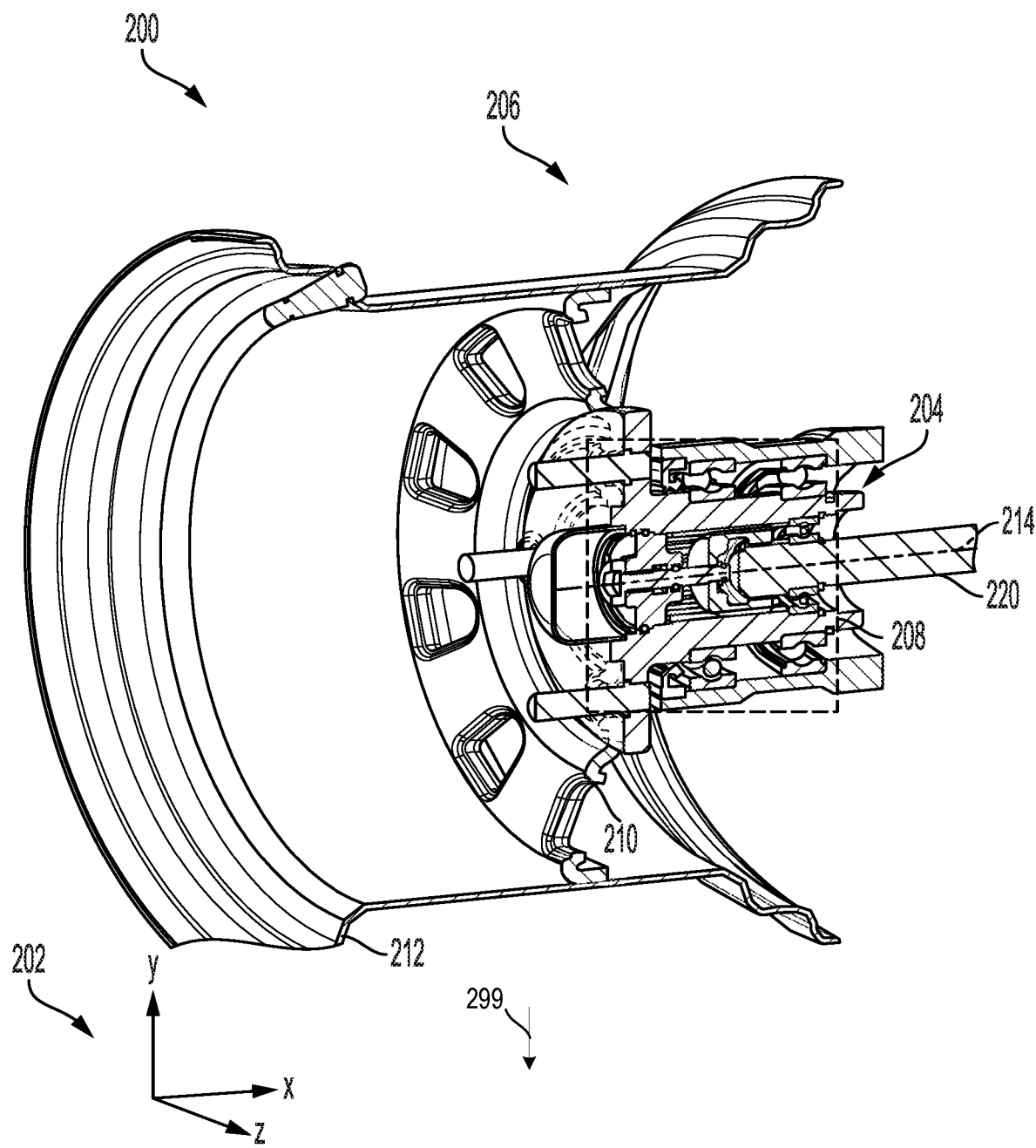
FIG. 2 shows a first sectional view of a wheel including a coupling mechanism.
Figure 3:
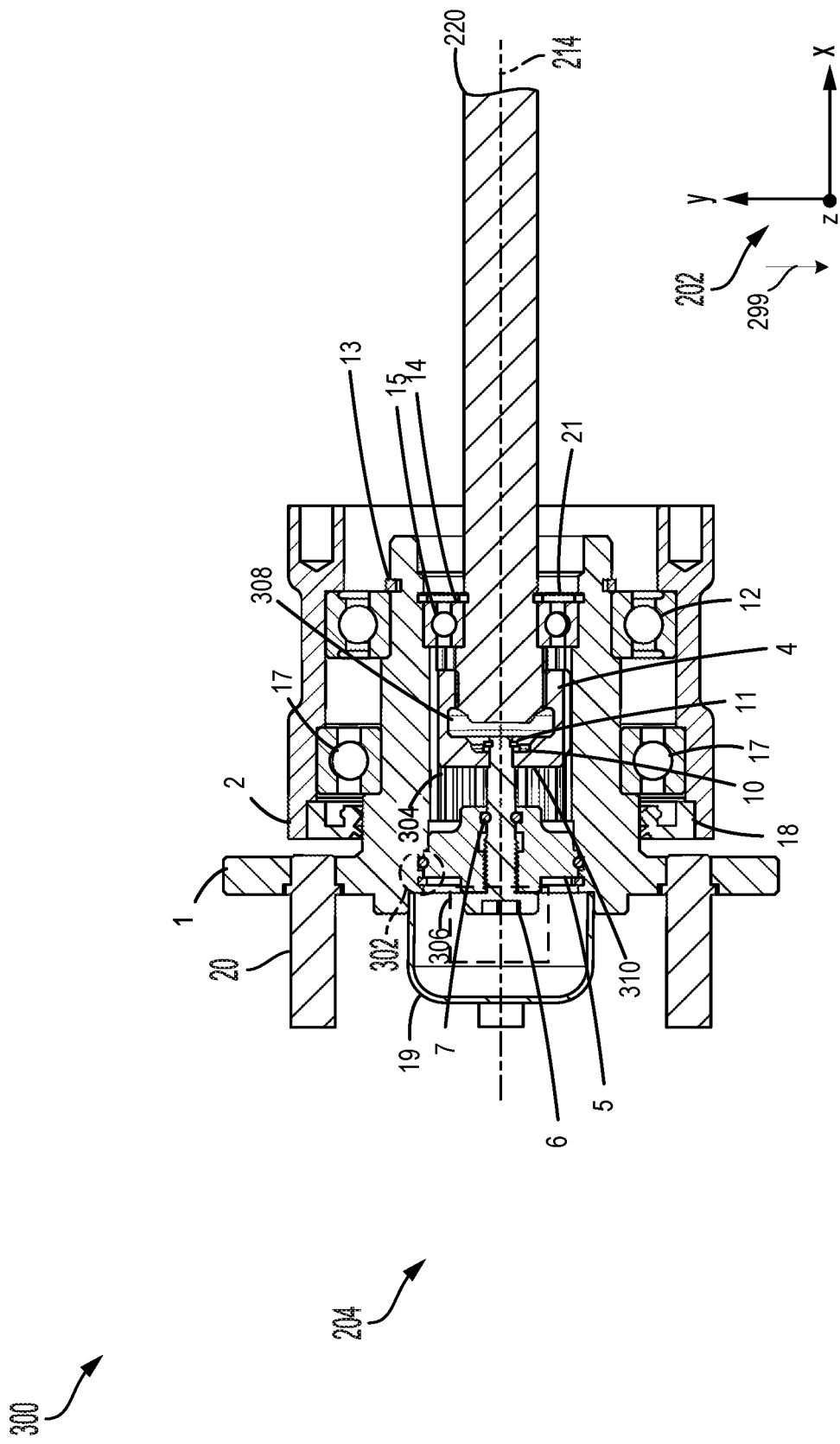
FIG. 3 shows a cross-sectional view of the coupling mechanism in an engaged state.
Figure 4:
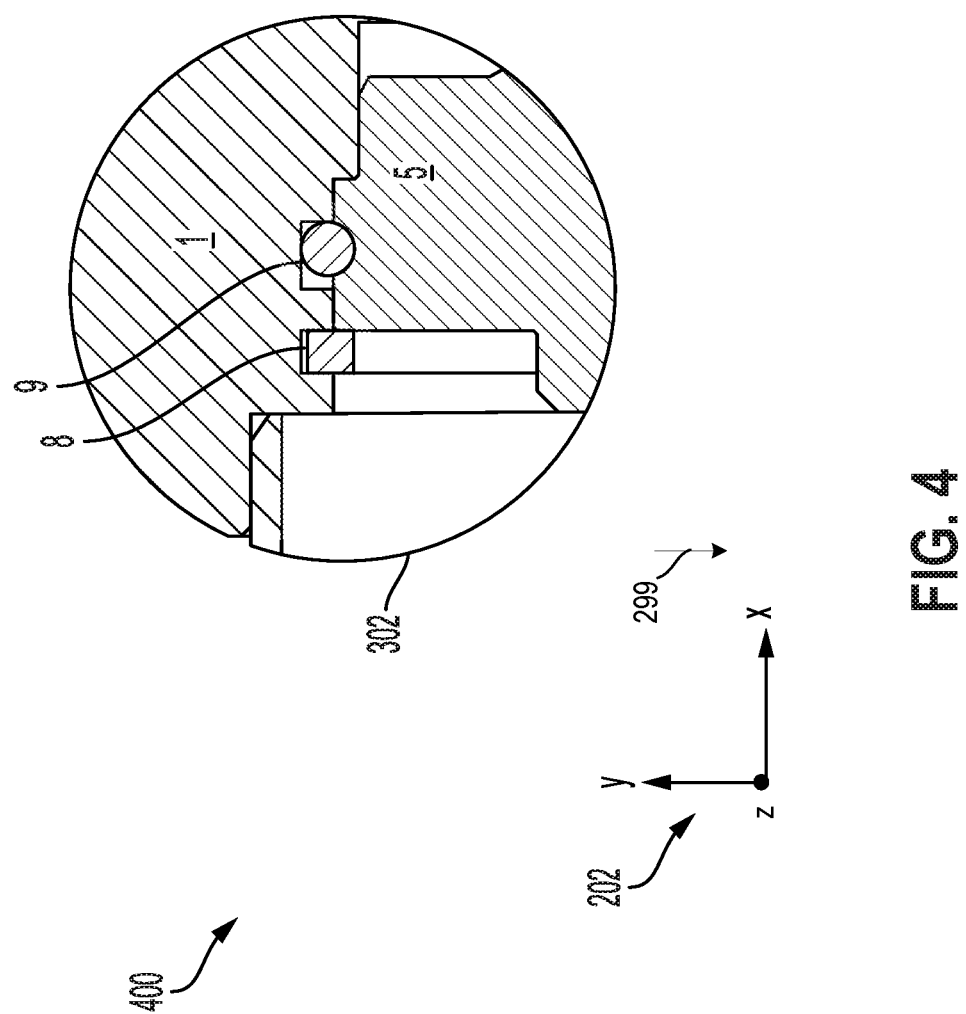
FIG. 4 shows an enlarged view of a portion of FIG. 3.
Figure 5:
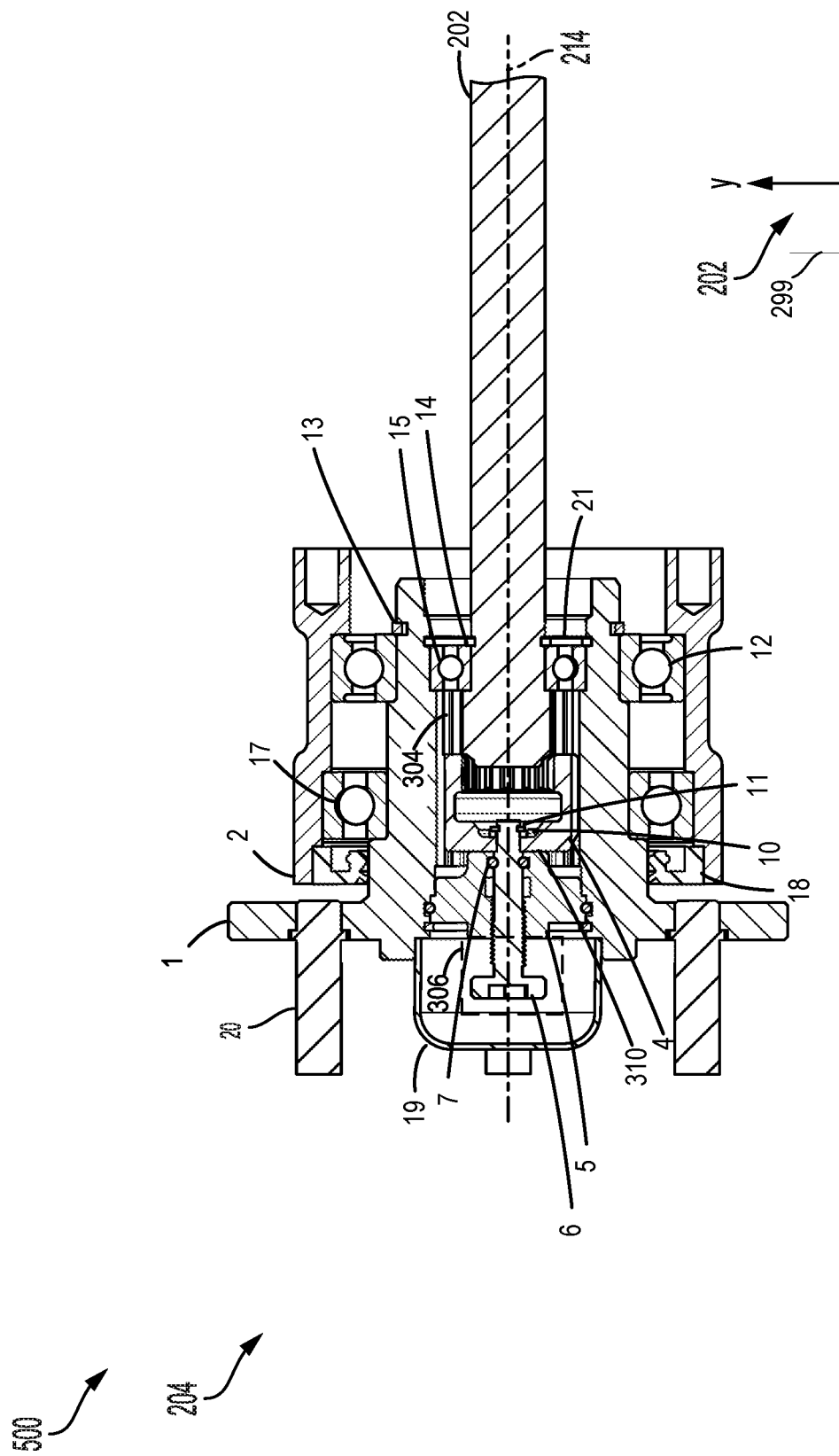
FIG. 5 shows a cross-sectional view of the coupling mechanism in a disengaged state.
Figure 6:
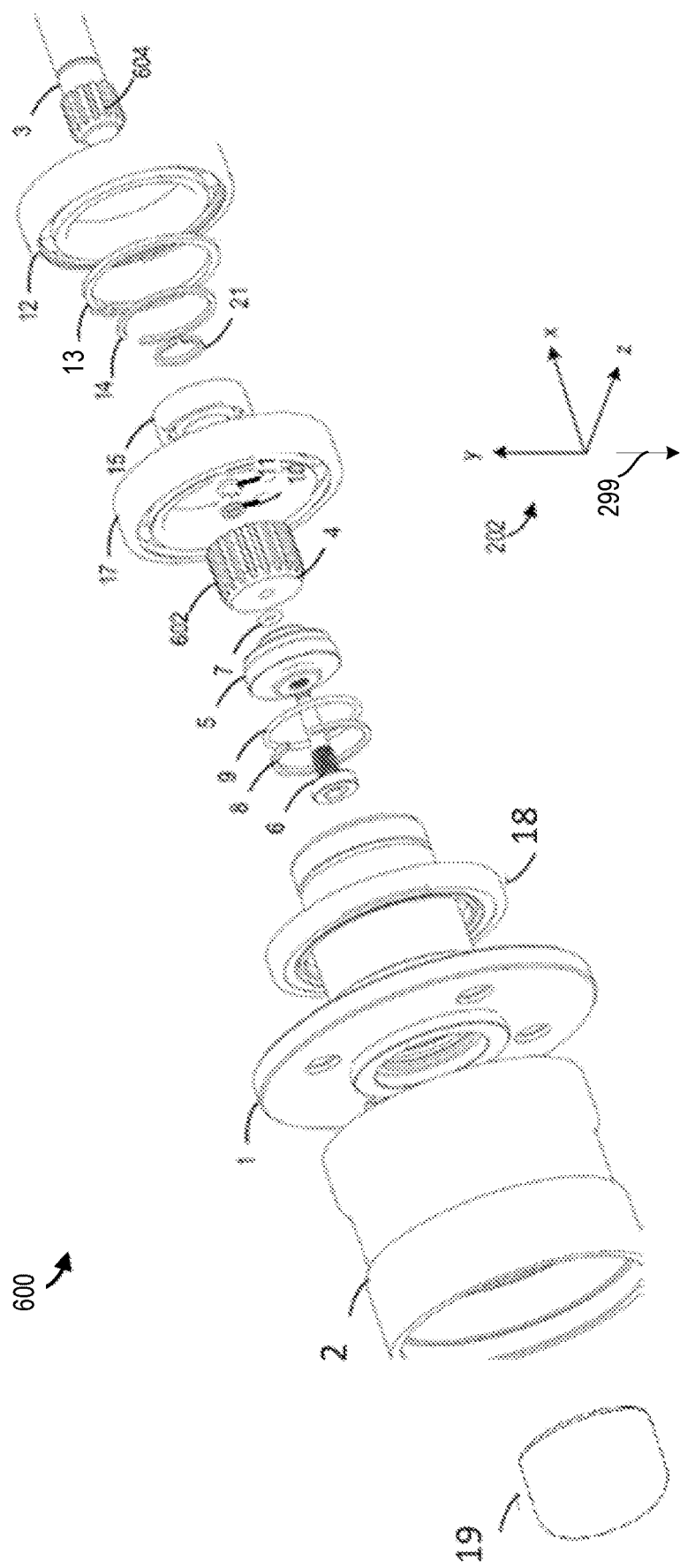
FIG. 6 shows an exploded view of the coupling mechanism.
Figures 9A, 9B:
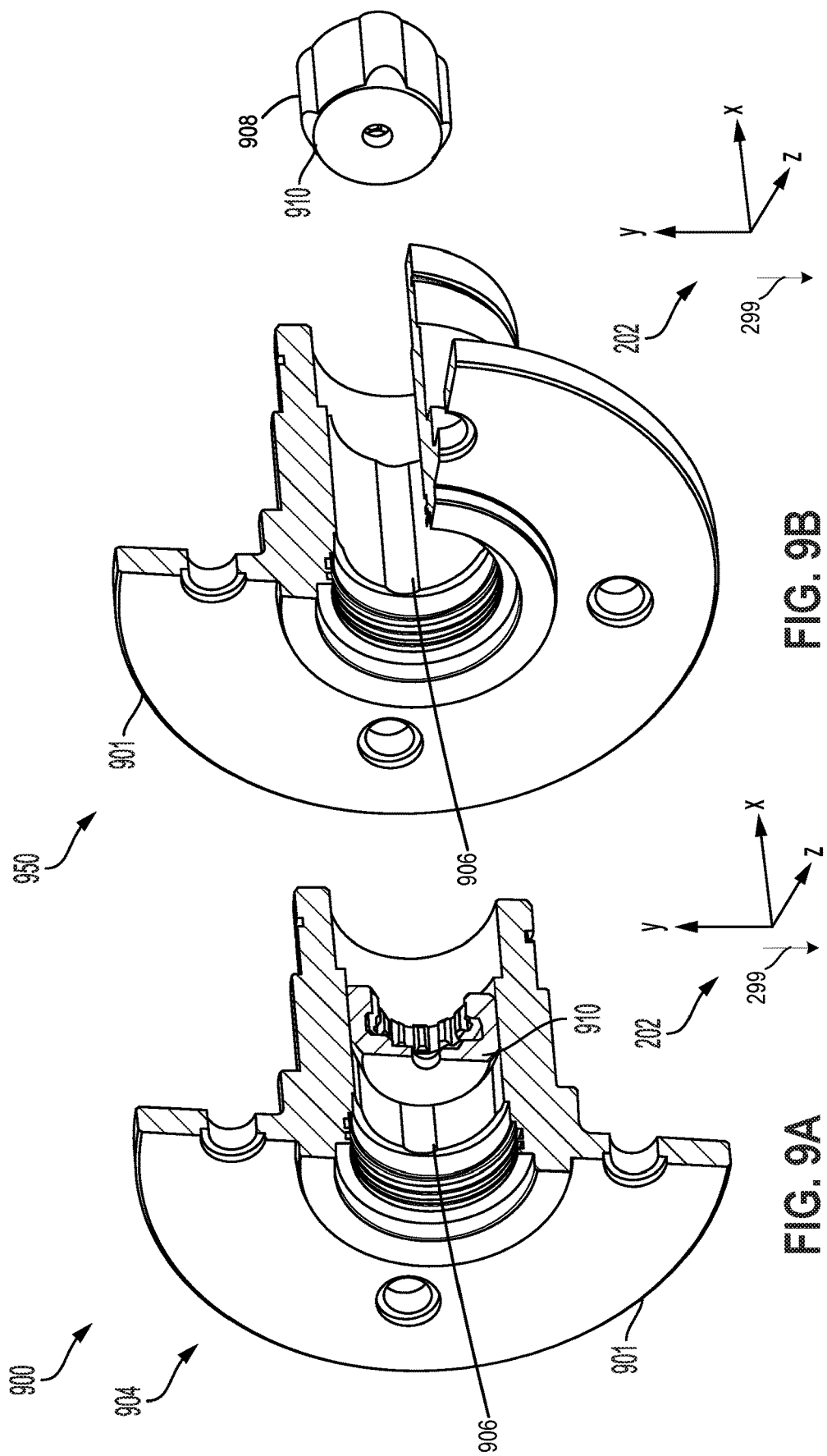
FIG. 9A shows a cross-sectional view of a first alternate embodiment of the coupling mechanism including lobes.
FIG. 9B shows an exploded view of the first alternate embodiment of the coupling mechanism including lobes.
Figure 10A:
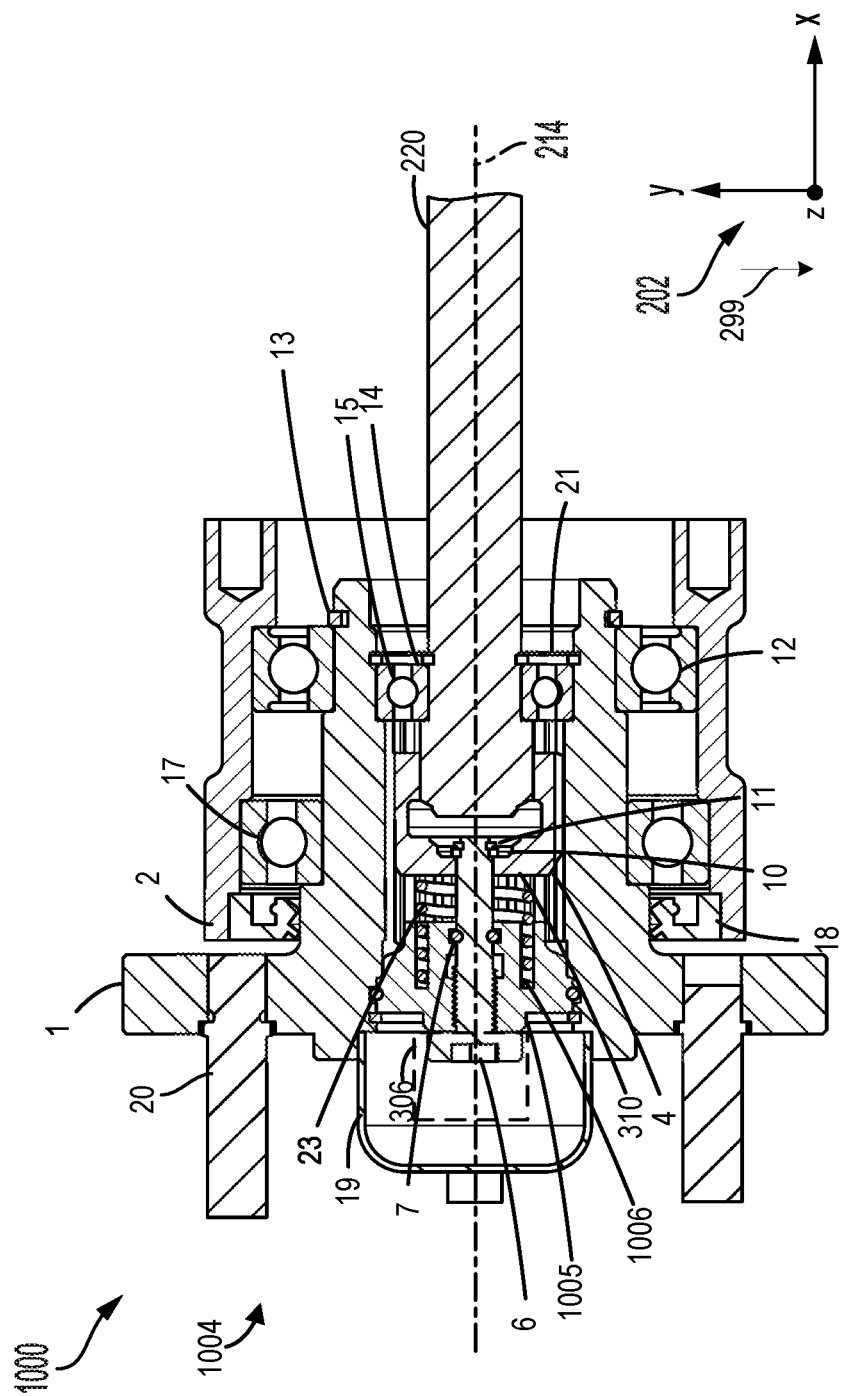
FIG. 10A shows a cross-sectional view of a second alternate embodiment of the coupling mechanism including a spring in an engaged state.
Figure 10B:
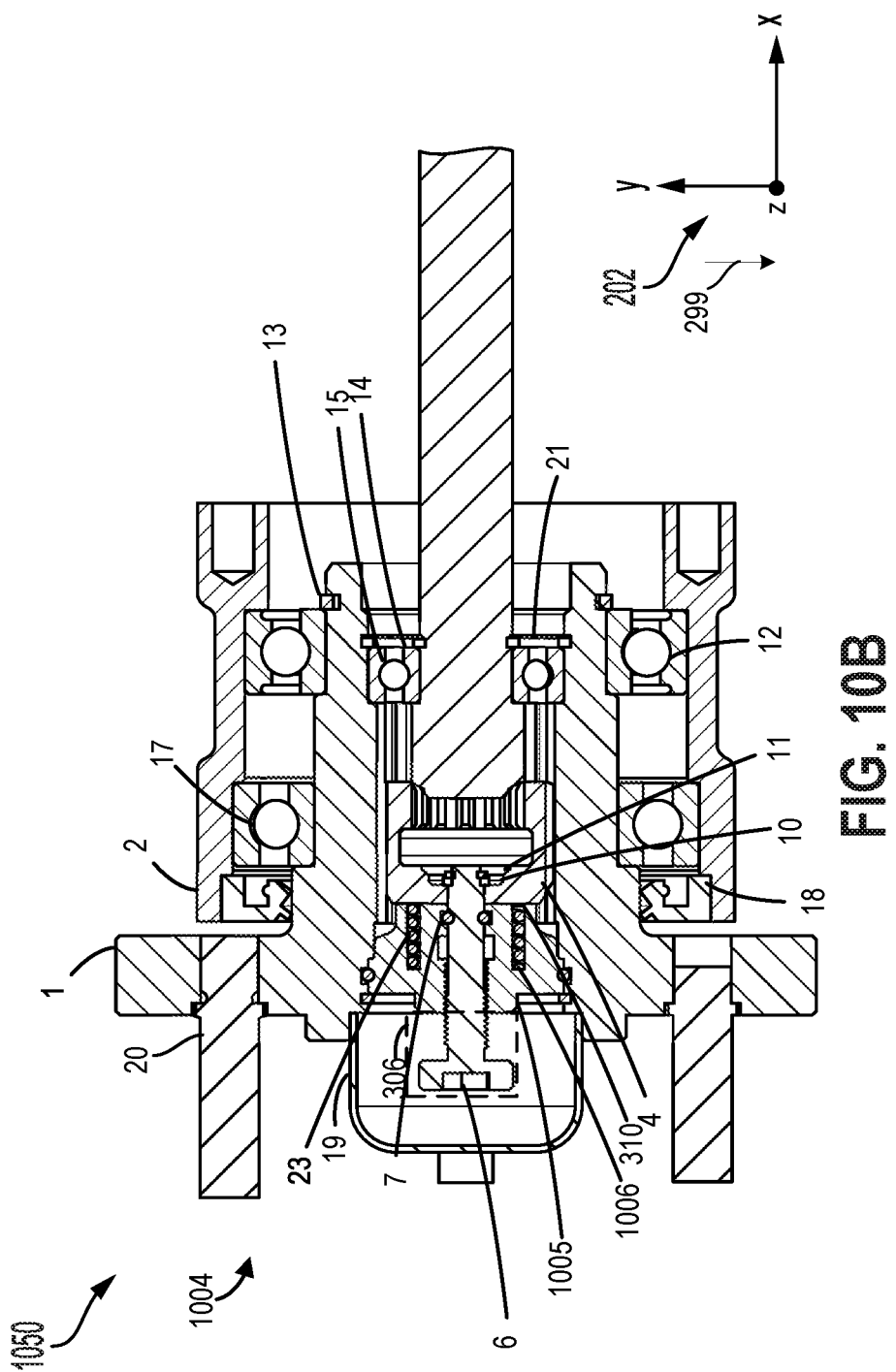
FIG. 10B shows a cross-sectional view of the second alternate embodiment of the coupling mechanism including the spring in a disengaged state.

The following description relates to systems and methods for engaging and disengaging a wheel of a vehicle from a drive shaft of the vehicle. An example of the vehicle is shown in FIG. 1. A first sectional view of coupling mechanism positioned between the drive shaft and wheel is shown in FIG. 2. The coupling mechanism may be in an engaged or disengaged state. In an engaged state the wheel may be coupled to the drive shaft and torque provided by a prime mover of the vehicle may be transferred to the wheel. Views of an exemplary embodiment of the coupling mechanism in an engaged position are shown in FIGS. 3-4. A view of the exemplary embodiment of the coupling mechanism in a disengaged position is shown in FIG. 5. An additional exploded view of the coupling mechanism is shown in FIG. 6. The splines and threads of the coupling mechanism and drive shaft may be shown in more detail in the sectional views shown in FIGS. 7-8. A first alternate embodiment of the coupling mechanism including lobes is shown in FIGS. 9A and 9B. A second alternate embodiment of the coupling mechanism including a helical spring is shown in FIGS. 10A and 10B. An example of a method for using the coupling mechanism is shown by a flow chart in FIG. 11.

Turning now to FIG. 1, it shows a vehicle 100 comprising a first drive shaft 102 and a second drive shaft 112. The first drive shaft 102 may be configured to drive a first set of wheels 104 proximal to a vehicle front end 101 and the second drive shaft 112 may be configured to drive a second set of wheels 114 proximal to a vehicle rear end 111. In one example, first drive shaft 102 is arranged near a front of the vehicle 100 and second drive shaft 112 is arranged near a rear of the vehicle 100.

The vehicle may include one or more of a plurality of mobile assets including commercial vehicles, passenger vehicles, off-highway vehicles, and other vehicles including at least one prime mover (e.g., an engine and/or an electric motor) configured to rotate wheels for propulsion.

Vehicle 100 may also include an engine 116. Engine 116 may be configured to output power to first set of wheels 104 and second set of wheels 114 as torque. Engine 116 may be an internal combustion engine, diesel engine, electric motor, among others. In one embodiment, engine 116 may be coupled to first set of wheels 104 via a driveline 118. Additionally or alternatively, driveline 118 may couple engine 116 to second drive shaft 112. Driveline 118 may include a transmission 120 and one or more coupling mechanisms 122, first drive shaft 102 and second drive shaft 112. One or more coupling mechanisms 122 may be positioned between one or more of the wheels of vehicle 100 and the drive shaft to which they are coupled. As one example, one or more coupling mechanisms may 122 be positioned between first drive shaft 102 and front wheels 104 and/or between second drive shaft 112 and second set of wheels 114. One or more coupling mechanisms 122 may be accessed from a wheel end of driveline 118 to disengage or engage the one or more wheels from the drive shaft as described further below with respect to FIGS. 2-10B.

The vehicle 100 may be controlled at least partially by a control system 170, including a controller (e.g., control unit) 130, and by input from a vehicle operator. The control system 170 is shown receiving information from a plurality of sensors 160 (various examples of which are described herein) and sending control signals to a plurality of actuators 180. As one example, the sensors 160 may include speed sensors, torque load sensors, and/or temperature sensors. As another example, actuators 180 may include rotary actuators of each coupling mechanism 122. The controller 130 may receive input data from the various sensors, process the input data, and trigger the actuators in response to the processed input data based on instruction or code programmed in a memory of the controller 130 corresponding to one or more routines. For example, the controller 130 may actuate a rotary motor of one or more of coupling mechanisms 122 in response to a user request to disengage first set of wheels 104 and/or second set of wheels 114 to prepare for towing vehicle 100. The controller 130 may be a microcomputer, including a microprocessor, input/output ports, an electronic storage medium for executable programs and calibration values (e.g., a read-only memory, or ROM), a random access memory (RAM), a keep alive memory (KAM), and a data bus. The storage medium read-only memory can be programmed with computer readable data representing instructions executable by the microprocessor for performing the methods and routines described herein as well as other variants that are anticipated but not specifically listed.

First set of wheels 104 and second set of wheels 114 may be coupled to first drive shaft 102 and second drive shaft 112 respectively. First set of wheels 104 and/or second set of wheels 114 may be in an engaged position, thereby receiving torque from the first drive shaft 102 and second drive shaft 112 respectively and rotating to propel the vehicle. Under certain conditions, it may be desirable to disengage first set of wheels 104 and second set of wheels 114 from first drive shaft 102 and second drive shaft 112 respectively, allowing first set of wheels 104 and second set of wheels 114 to rotate freely. In some examples, disengaging a set of wheels from a shaft may be accomplished by a clutch of the vehicle or by a mechanism internal to gear box of driveline 118. However, such mechanisms may not be desired due to space limitations in some drivetrain configurations. A coupling mechanism, such as the one described further below with respect to FIGS. 2-10B wherein the coupling mechanism is on a wheel end of the driveline, may be desirable.

Turning now to FIG. 2, a first view 200 is shown of coupling mechanism 204 positioned at a radial center of a hub 210 of a wheel 206. A coordinate system 202 including a y-axis, x-axis and z-axis is shown for comparison between the view of FIGS. 2-10B. The x-axis may be parallel to a lateral direction (e.g., an axial direction) normal to a direction of vehicle travel. The y-axis may be parallel to a vertical direction, normal to the x-axis and the direction of vehicle travel. The z-axis may be parallel to the direction of vehicle travel and normal to the x- and y-axes. Arrow 299 illustrates a direction of gravity, which is parallel to the y-axis.

Wheel 206 may be a left or right front wheel (such as one of first set of wheels 104 of FIG. 1) or a left or right rear wheel (such as one of second set of wheels 114 of FIG. 1). Wheel 206 may also include a wheel rim 212, circumferentially surrounding hub 210. Wheel 206 may be configured to rotate around rotational axis 214, parallel to the x-axis, when coupled to a drive shaft 220. Drive shaft 220 may be a component of a driveline of a vehicle such as driveline 118 of vehicle 100 as shown in FIG. 1. Drive shaft 220 may be a front drive shaft such as first drive shaft 102 of FIG. 1 or a rear drive shaft such as second drive shaft 112 of FIG. 1. A coupling mechanism 204 may be positioned at a radial center of hub 210. Coupling mechanism 204 may be similar to coupling mechanism 122 of FIG. 1. An area within box 208 including coupling mechanism 204 is shown in greater detail as cross sectional view 300 in FIG. 3.

Turning now to FIG. 3, a cross sectional view 300 of coupling mechanism 204 is shown in an engaged state. As such, components previously introduced are similarly numbered in this and subsequent figures. Wheel 206 is omitted from view 300 for clarity. Coupling mechanism 204 in the engaged state may couple drive shaft 220 to wheel 206. Coupling mechanism 204 may include a coupler 4 circumferentially surrounding an axially outer end (e.g., an end closest to wheel 206) when in the engaged state. A drive shaft side radially inner surface 308 of coupler 4 may be configured to couple to a radially external surface of the end of drive shaft 220. In one example, the radially inner surface of coupler 4 may include inner splines configured to couple (e.g., mesh) with radially outer splines on the radially external surface of drive shaft 220.

An axial wheel side end 310 (e.g., outer end to the left side with respect to the x-axis) of coupler 4 may be coupled to an axially inner end (e.g., right side with respect to the x-axis, closer to drive shaft 220) of a pin 6. In one embodiment, pin 6 may include external threads and may be herein referred to as screw 6. External threads may be formed on a portion of an outer radial surface of screw 6. However, alternate embodiments of pin 6, such as a bolt or clamp, have been considered within a scope of this disclosure. Axial wheel side end 310 may circumferentially surround a portion of screw 6. The axially inner end of screw 6 closest to drive shaft 220 along the x-axis may be positioned within coupler 4. A spacer 10 and a ring 11 may each circumferentially surround the portion of screw 6 positioned radially interior to coupler 4. An axially outer surface of spacer 10 may be in face sharing contact with the a wheel side radially inner surface of coupler 4. Ring 11 may be positioned axially behind (e.g., closer to drive shaft 220 along the x-axis) spacer 10, ensuring face sharing contact between spacer 10 and coupler 4. In this way spacer 10 and ring 11 may together mechanically couple screw 6 to coupler 4 while screw 6 is not in direct contact with coupler 4. Because screw 6 and coupler 4 are mechanically coupled, axial movement of screw 6 (e.g., movement left and right along the x-axis) may result in corresponding axial movement of coupler 4. Axial movement of screw 6 from a first position to a second position, axially opposite the first position may be a result of rotating screw 6 in a clockwise or counter-clockwise direction. Additionally, spacer 10 and ring 11 may mechanically couple screw 6 to coupler 4 so that coupler 4 may move axially (along the x-axis) with screw 6 while screw 6 and coupler 4 may each rotate independently around rotational axis 214. In this way, screw 6 may rotate without transferring torque to coupler 4. Additionally, coupler 4 may slide axially along internal spindle splines, but may not rotate around rotational axis 214 individually.

When coupling mechanism 204 is actuated in the first direction, coupling mechanism 204 moves to the engaged state (e.g., screw 6 is rotated clockwise and tightened), radially internal splines of coupler 4 may engage with radially external splines of drive shaft 220, thereby transferring torque from rotation of drive shaft 220 to coupler 4. When coupling mechanism 204 is actuated in the second direction, coupling mechanism 204 moves to the disengaged state (e.g., screw 6 is rotated in a counter-clockwise direction and loosened) and radially internal splines of coupler 4 may disengage (e.g., are not in contact with) with external splines of drive shaft 220, thereby allowing drive shaft 220 to rotate freely allowing no transfer of torque from rotation of drive shaft 220 to coupler 4.

Coupling mechanism 204 may further include a spindle 1. Coupler 4 may be circumferentially surrounded by a spindle 1. A radially internal surface of spindle 1 may include inner spindle splines 304 configured to engage spines on a radially outer surface of coupler 4. In this way, a position of coupler 4 within spindle 1 may be secured. Spindle 1 may be mechanically coupled to hub 210 of FIG. 2 by one or more studs 20. In this way spindle 1 may rotate in unison with hub 210 and wheel 206. A housing 2 may circumferentially surround spindle 1 and provide support to a front main wheel bearing 17 and a rear main wheel bearing 12. Front main wheel bearing 17 and rear main wheel bearing 12 may be positioned between a radially outer surface of spindle 1 and a radially inner surface of housing 2. An external spindle retaining ring 13 may be positioned around a radially outer surface of spindle 1 and behind (e.g., to the right, drive shaft side, along the x-axis) rear main wheel bearing 12, thereby securing an axial position of rear main wheel bearing 12. Additionally, a lip seal 18 may be positioned radially between spindle 1 and housing 2 in front of (e.g., to the left, wheel side along the x-axis) front wheel bearing 17. Lip seal 18 may be configured to prevent dirt and debris from passing in between spindle 1 and housing 2 which may interfere with smooth rotation of spindle 1 within housing 2.

Drive shaft 220 may be supported by shaft ball bearings 15 positioned radially between drive shaft 220 and spindle 1. Shaft ball bearings 15 may circumferentially surround drive shaft 220. In this way, drive shaft 220 may be maintained in a concentric position with respect to spindle 1 and drive shaft 220 may rotate without affecting spindle 1. An internal shaft retaining ring 14 and an external shaft retaining ring 21 may each be positioned behind shaft ball bearings 15 and may help to secure an axial position of shaft ball bearings 15. Internal shaft retaining ring 14 may be positioned directly behind (e.g., to the right, drive shaft side of) shaft ball bearings 15 and in front of (e.g., to the left, wheel side of) external shaft retaining ring 21. In this way, coupler 4 may move smoothly over splines of spindle 1 when transitioning from the engaged state shown in FIG. 3 to the disengaged state discussed further below with respect to FIG. 5. Inner spindle splines 304 and splines on the radially outer surface of coupler 4 as well as splines on the radially outer surface of drive shaft 220 and the inner radially surface of coupler 4 may be lubricated with the same oil used in a planetary gear box.

Coupling mechanism 204 may further include a block 5. Block 5 may circumferentially surround a portion of screw 6 and may be radially positioned between a radially outer surface of screw 6 and a radially inner surface of spindle 1. Additionally, block 5 may be positioned at an axially outer end (e.g., wheel side) of spindle 1 in front of (e.g., closer to wheel 206) coupler 4. In one embodiment, a portion of a radially inner surface of block 5 may be threaded, thereby engaging external threads positioned on a portion of the radially external surface of screw 6. In an exemplary embodiment, the threaded portion of screw 6 may be axially longer than the threaded portion of block 5. In an alternate embodiment, block 5 may engage pin 6 by a series of ridges or other features continued to hold pin 6 in place unless purposefully moved.

Additionally, block 5 may include an inner O-ring 7. Inner O-ring 7 may circumferentially surround a portion of screw 6 which his not threaded and may be positioned at an axially inner, non-threaded end of block 5 closest to drive shaft 220. Inner O-ring 7 may be positioned to arrest leakage of lubricant oil when screw 6 is moved in and out (e.g., transitioning between the engaged state and the disengaged state) as well as when wheel 206 is rotating. An outer O-ring 9 may be positioned around an outer diameter of block 5, radially between block 5 and spindle 1, to arrest leakage of lubricant oil from between block 5 and spindle 1.

An axially outer end of screw 6 (e.g., a head of screw 6) may protrude from block 5 and may be protruding from an axially outer surface of spindle 1. The head of screw 6 may be configured to be engaged by hand. In one embodiment, the screw may be turned by a hand, with or without the use of a hand tool such as a wrench or screwdriver. In an alternate embodiment, coupling mechanism 204 may include an actuator 306 configured to engage with the head of screw 6. Actuator 306 may be communicatively coupled to a controller of the vehicle such as controller 130 of FIG. 1.

Additional details with regards to an interface between block 5 and spindle 1 are shown in close up view 400 of FIG. 4. Close up view 400 may correspond to an area within circle 302 of FIG. 3. As shown in view 400, the outer surface of block 5 may be formed to include a step interference fit between block 5 and spindle 1. In this way rotation of block 5 around rotational axis 214 may be prevented when screw 6 is moved in and out (e.g., between engaged and disengaged). Said another way, block 5 may remain stationary while coupling mechanism 204 is switched between the engaged state and the disengaged state. In an alternate embodiment, the interference fit between block 5 and spindle 1 may additionally or alternatively include threads, knurling, serrations, or other surface features configured to fixedly coupling block 5 to spindle 1. An internal retainer ring 8 may be positioned between the radial outer surface of block 5 and the radial inner surface of spindle 1 to prevent axial (e.g., along the x-axis) movement of block 5. In this way, once pressed in, block 5 may be fixedly coupled to spindle 1.

Returning now to FIG. 3, coupling mechanism 204 may additionally include a cap 19 removably coupled to an axially outer face of spindle 1. Cap 19 may cover the head of screw 6 and an axially outer face of block 5 and may block the threads of block 5 and screw 6 from contamination by dirt and debris, Turning now to FIG. 5, a cross-sectional view 500 of coupling mechanism 204 is shown in a disengaged state. In the disengaged state, drive shaft 220 may not be coupled to coupler 4. Transitioning from the engage state to the disengaged state, screw 6 may be loosened (e.g., unscrewed or turned in a counter-clockwise direction) and may thereby pull coupler 4 via spacer 10 along rotational axis 214 towards hub 210 and block 5 and thereby uncouple coupler 4 from drive shaft 220. Block 5 may be stationary as screw 6 is actuated (e.g., transitioning between the engaged state and the disengaged state or vice versa). In the disengaged state, axial wheel side end 310 of coupler 4 may be in face sharing contact with the axially inner side of block 5 and a gap between block 5 and coupler 4 is absent in the disengaged state. Further, in the disengaged state, no torque may be transferred from drive shaft 220 in the forward or reverse directions to the coupler 4 or the wheel 206, and conversely no motion or torque maybe transferred from wheel 206 to drive shaft 220. In this way, wheel 206 may rotate freely and allow the vehicle to be towed without and resistance from a drivetrain of the vehicle.

Figure 7:
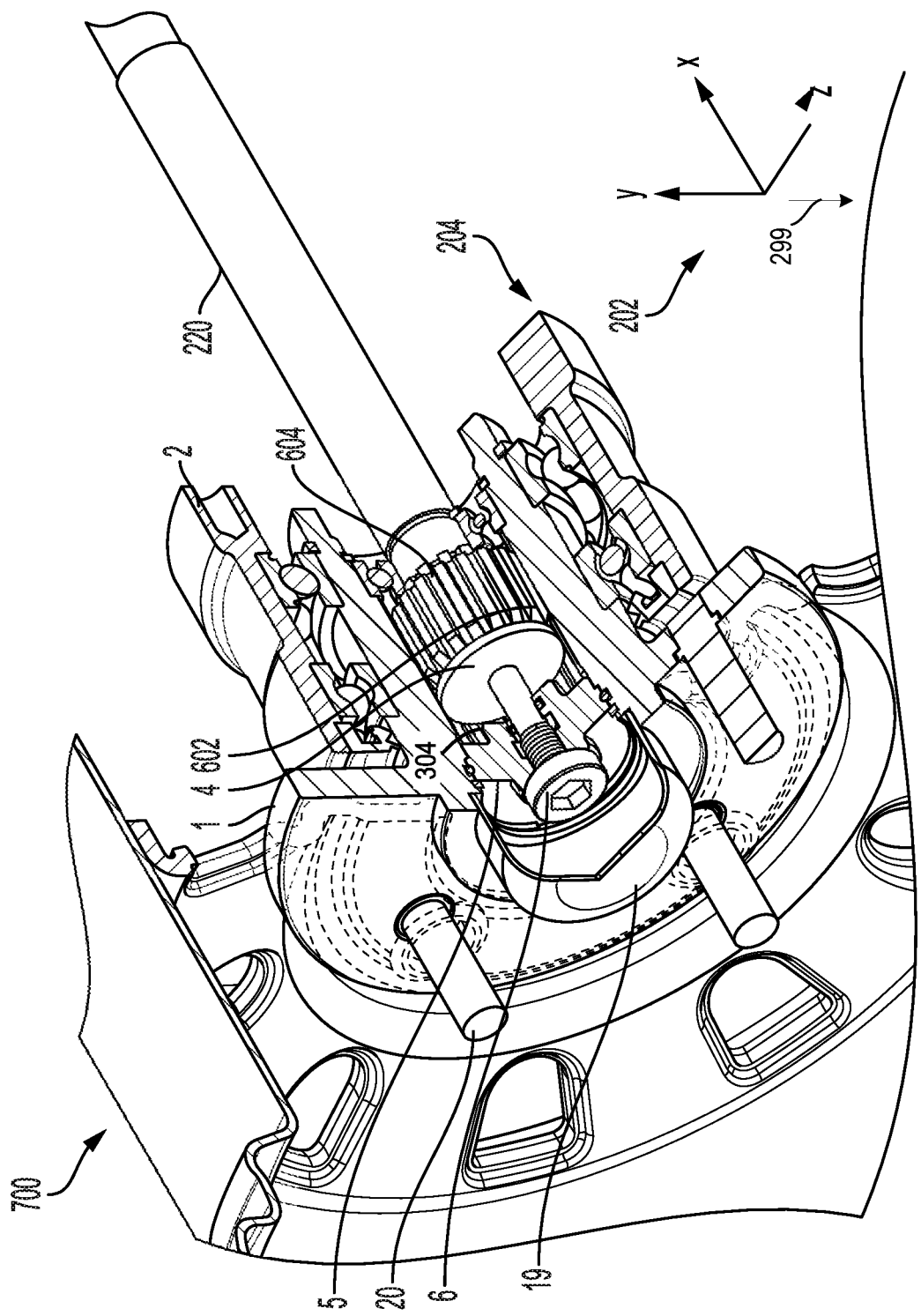
FIG. 7 shows a sectional view of splines of the coupling mechanism.
Figure 8:
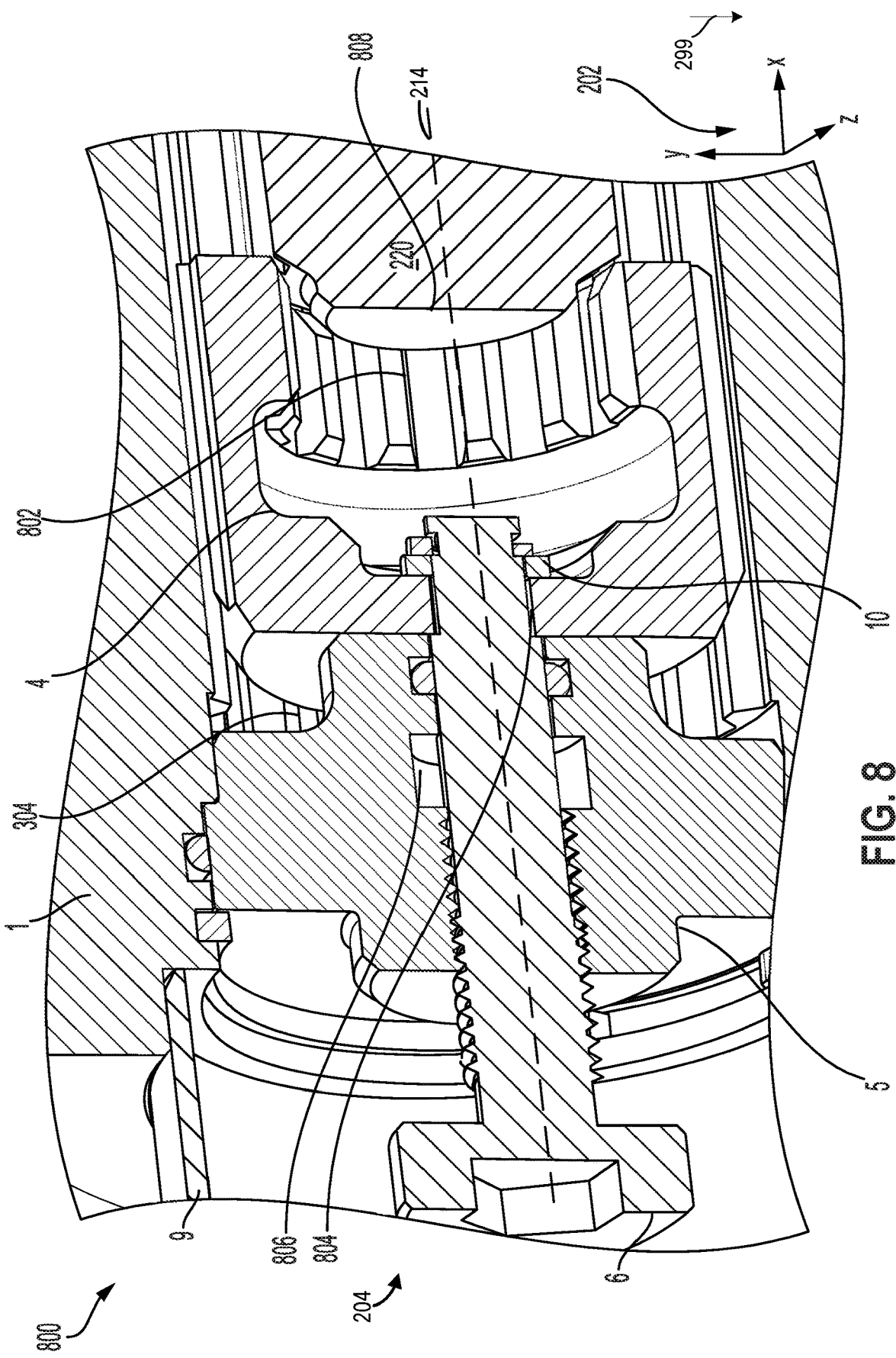
FIG. 8 shows a second sectional view of the coupling mechanism.

Further details of coupling mechanism 204 may be seen in exploded view 600 of FIG. 6, perspective view 700 of FIG. 7, and cross-sectional view 800 of FIG. 8. Turning now to FIG. 6, exploded view 600 show components coupling mechanism 204 and drive shaft 220. The radially outer surface of coupler 4 may be seen in exploded view 600. The radial outer surface of coupler 4 of may include outer coupler splines 602 configured to engage inner spindle splines 304. Additionally, an end of drive shaft 220 may include drive shaft splines 604 configured to engage with splines formed on the radially inner surface of coupler 4. An axial length of drive shaft splines 604 may be chosen to fully mesh with inner surface spines of coupler 4 when coupling mechanism 204 is in the engaged position. As shown in exploded view 600, screw 6 may be an internal hex head screw. Other types of screws including but not limited to a hexagon head, Philips head, or thumb screw, among others have been considered within a scope of this disclosure.

Turning now to FIG. 7, a perspective view 700 of coupling mechanism 204 in an engaged state is shown. Inner spindle splines 304 covering the radial inner surface of spindle 1 may be configured to engage with outer coupler splines 602 on the radial outer surface of coupler 4. An axial length (e.g., along the x-axis) of inner spindle splines 304 may be longer than an axial length of coupler 4. In this way, splines covering the inner spindle surface may engage outer surface coupler splines 602 while coupler 4 moves from the engaged state to the disengaged state. Splines covering the radially inner surface of coupler 4 may be configured to engage with drive shaft splines 604. In on example, an axial length of drive shaft splines 604 may be longer than the axial length of coupler 4. In this way, drive shaft splines 604 may be in full face sharing contact with the inner surface of coupler 4 when in the engaged state and torque may be efficiently transferred from drive shaft 220 to coupler 4. As one example, standard sizing of DIN 5480 may be used for the splines of decoupling mechanism 204. However, other complementary sizes of splines have been considered within the scope of this disclosure.

Turning now to FIG. 8, an enhanced cross-sectional view 800 of coupling mechanism 204 is shown, including coupler 4, block 5, screw 6, and drive shaft 220. As described above, coupler 4 may rotate not rotate around rotational axis 214 independently of spindle 1. Said another way, coupler 4 may float within spindle 1 with respect to rotation of screw 6. FIG. 8 shows a gap 804 between screw 6 and coupler 4. Gap 804 may prevent direct physical contact between coupler 4 and screw 6. Instead, coupler 4 may be in physical contact with spacer 10 in the engaged state and with spacer 10 and block 5 in the disengaged state. Additionally, a length of inner spindle splines 304 may be greater than a length of outer coupler splines 602. The length of inner spindle splines 304 may be chosen so coupler 4 moves axially along inner spindle splines 304 and outer coupler splines 602 remain meshed with inner spindle splines 304 when coupling mechanism 204 is in the engaged state and in the disengaged state and during the transition between the two.

Block 5 may additionally include a cavity 806. Cavity 806 may circumferentially surround screw 6 and may be positioned axially (along the x-axis) between the threaded portion of block 5 and inner O-ring 7. As one example, cavity 806 may include a left side (e.g., axially outer side along x-axis), a right side (e.g., axially inner side along x-axis), and an outer side (e.g., side radially closest to spindle 1) formed by block 5. An inner side (e.g., side radially opposite of the outer side along the z-axis) may be formed by screw 6. Cavity 806 may contain grease which aids in maintaining smooth movement of screw 6 within block 5. FIG. 8 may also show a wheel side end 808 of drive shaft 220 configured to engage with coupler 4. The wheel side end 808 of drive shaft 220 may be shaped as a larger chamfer. In this way, the splines of drive shaft 220 may smoothly engage with the inner splines 802 of coupler 4.

A first alternate embodiment of a coupling mechanism 904 is shown in a cross sectional view 900 in FIG. 9A and in an exploded view 950 in FIG. 9B. Coupling mechanism 904 may include a spindle 901 and coupler 910. Coupling mechanism 904 may also include additional components such as screw 6 and block 5 which are discussed above with respect to FIGS. 2-8. Such components are omitted from FIGS. 9A and 9B for clarity. A radially inner surface of spindle 901 and a radially outer surface of coupler 910 may be formed as interlocking lobes in place of splines. As radially inner surface of spindle 901 may include negative lobes 906 and a radially outer surface of coupler 910 may include positive lobes 908. Lobes may be more cost effective to manufacture than splines (e.g., inner spindle splines 304 of FIG. 3 and outer coupler spline 602 of FIG. 6). However, ease of manufacture may be traded for a limited amount of torque transferred by the lobes when compared to splines. As shown in cross sectional view 900, an inner surface of coupler 910 may be formed as splines, similar to coupler 4. In this way coupler 910 may interlock with drive shaft 220 a described above with respect to coupler 4 of FIGS. 2-8.

A second alternate embodiment of a coupling mechanism 1004 is shown in cross sectional views 1000 and 1050 in FIGS. 10A and 10B respectively. FIG. 10A shows coupling mechanism 1004 in an engaged state and FIG. 10B shows coupling mechanism 1004 in a disengaged state. Coupling mechanism 1004 may include a screw 6 and spindle 1 and other components that are discussed with respect to FIGS. 2-8. Such components are labeled similarly and will not be reintroduced.

Coupling mechanism 1004 may include a block 1005. Block 1005 may include a channel 1006. Channel 1006 may include an inner side (e.g., side radially closest to screw 6), an outer side (e.g., side radially closest to spindle 1), and a left side (e.g., axial outer side along the x-axis) formed by block 1005. Channel 1006 may include an opening facing opposite of the left side along the x-axis. A helical spring 23 may be positioned at least partially within channel 1006. A first end of helical spring 23 closest to hub 210 may be in contact with the left side of channel 1006 and a second end of helical spring 23 closest to drive shaft 220 may be in contact with the axially outer side of coupler 4 facing block 1005. When coupling mechanism 1004 is in the engaged state as shown in FIG. 10A, helical spring 23 may be in an extended (e.g., not compressed) state and may help force coupler 4 in a right direction (e.g., along the axis) towards drive shaft 220. When coupling mechanism 1004 is in the disengaged state as shown in FIG. 10B, helical spring 23 may be in a compressed state within channel 1006. The axially outer side of coupler 4 may press against helical spring 23, resulting in pressure on helical spring 23. Pressure in helical spring 23 may be released as coupling mechanism 1004 transitions from the disengaged state to the engaged state, thereby assisting in coupling of coupler 4 to drive shaft 220.

Figure 11:
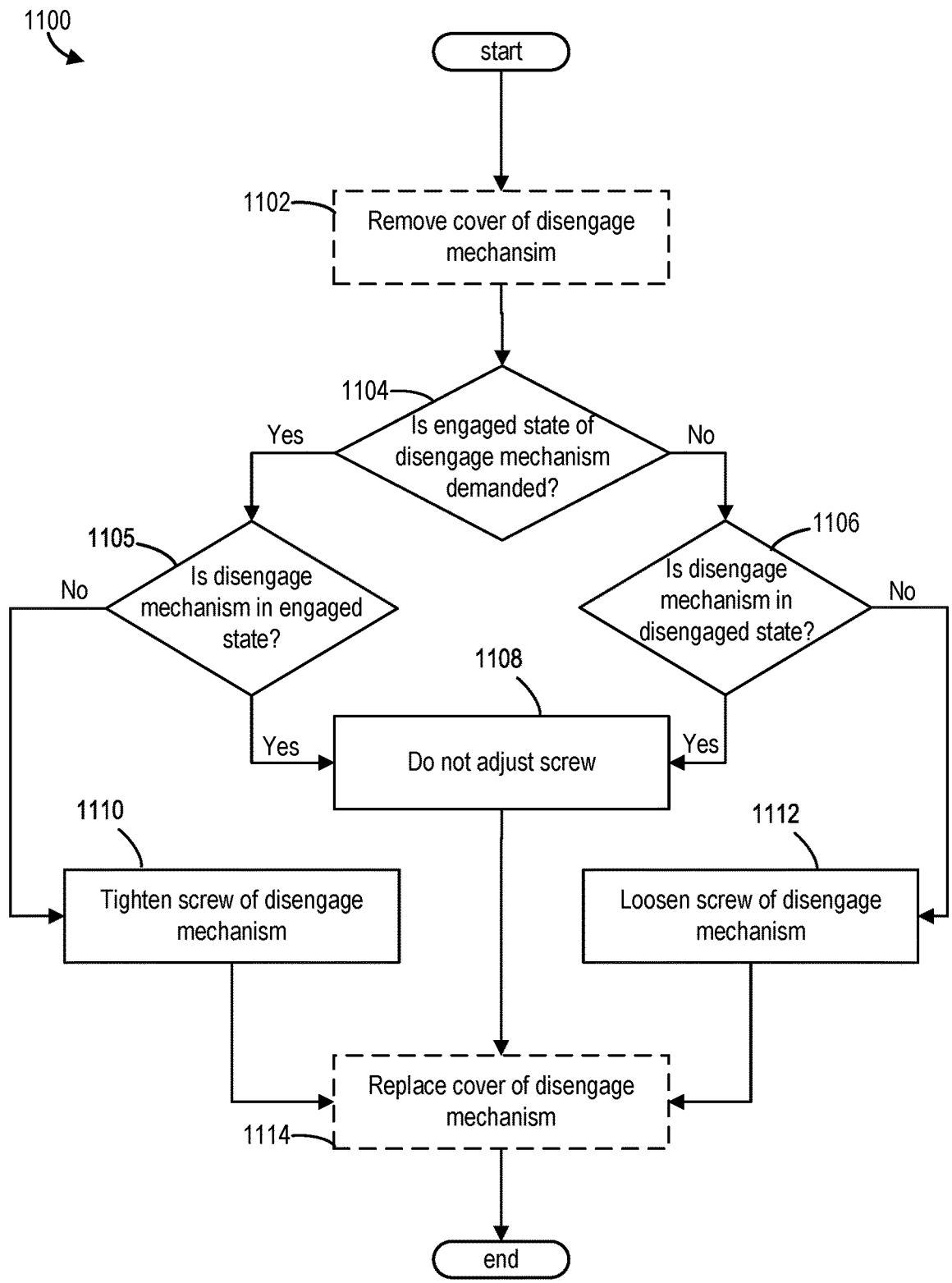
FIG. 11 shows an example of a flow chart of a method for operating the coupling mechanism.

Turning now to FIG. 11, an example of a method 1100 for operating a coupling mechanism of a wheel of a vehicle such as coupling mechanism 204, 904, or 1004 as described above in FIGS. 2, 9A-9B, and 10A-10B respectively is shown. As described above, the coupling mechanism may be in one of two states, an engaged state or a disengaged state. At least portions of method 1100 may be stored as executable instructions in non-transitory memory of a controller of the vehicle (e.g., controller 130 of FIG. 1). Portions of method 1100 may be performed by the controller transforming operating states of devices and actuators in the physical world.

At 1102, method 1100 may optionally include removing a cap of the coupling mechanism. The cap may be positioned at a radial center of a hub of the wheel and may cover the coupling mechanism to prevent dirt and debris from collecting within the coupling mechanism. Further the cap may be positioned at an axially outer surface of a spindle of the coupling mechanism and may be accessible by a user and not obscured by other parts of the wheel or vehicle. As one example, the cap may be coupled to the spindle by a snap, screw, or other mechanism which may allow for removal of the cap by a hand of user without the use hand tools.

At 1104, method 1100 includes determining if an engaged state of the coupling mechanism is demanded. If the coupling mechanism is in the engaged state, the hub may be coupled to a drive shaft of the vehicle and torque applied to the drive shaft of the vehicle may be transferred to the wheel of the vehicle through the hub. As one example, the engaged state of the coupling mechanism may be demanded by the user for two wheels of the vehicle to drive the vehicle in a two wheel drive mode or the engaged state of the coupling mechanism may be demanded for all four wheels of the vehicle is operation of the vehicle in a four wheel drive mode is desired.

If at 1104, the engaged state of the coupling mechanism is demanded, method 1100 may proceed to 1105 and includes determining if the coupling mechanism is in an engaged state. If the coupling mechanism is in the engaged state (e.g., a screw of the coupling mechanism is tightened), method 1100 proceeds to 1108 and the screw is not adjusted. Method 1100 then proceeds to 1114 and may optionally include replacing the cover of the coupling mechanism if it was removed at 1102. In one example, the cap may be replaced by the hand of the user without the use of hand tools. As one embodiment the cap may be removed at 1102 and replaced at 1110 if the screw is tightened and loosened by the hand of the user or by use of hand tools by the user. In an alternate embodiment, removing and replacing the cap may not be demanded if the screw is tightened and loosened by an actuator. Method 1100 ends.

If at 1105, the coupling mechanism is not in the engaged state, method 1100 proceeds to 1110 and includes tightening a screw of the coupling mechanism. Tightening the screw of the coupling mechanism may include rotating the screw clockwise until an axially inner surface of the screw is in face sharing contact with an axially outer surface of a block of the coupling mechanism. In one embodiment, the screw may be tightened by the hand of the user. In an alternate embodiment the screw may be additionally or alternatively tightened by action of a hand tool such as a wrench or screwdriver. As another alternate embodiment, the screw may be tightened by an actuator (e.g., actuator 306 of FIG. 3) directed by the controller of the vehicle. As one example, the screw may be tightened by applying a torque between 30 Nm and 40 Nm. Method 1100 proceeds to 1114.

If at 1104, method 1100 determines that the engaged state of the coupling mechanism is not desired, the disengaged state of the coupling mechanism may be desired. The disengaged state of the coupling mechanism may include a coupler of the coupling mechanism not in contact with the drive axel of the vehicle. When the coupling mechanism is in the disengaged state, rotation of the drive axel may not transfer torque to the hub of the vehicle and likewise, rotation of the hub may not transfer torque to the drive axel. As one example, the disengaged state of the coupling mechanism may be desired when a vehicle is being towed. In such an example, torque may be applied to one or more wheels of the vehicle by a force outside the vehicle, such as a tow truck or auxiliary vehicle dragging the vehicle and rotation of the drive axel by the force outside the vehicle may degrade the drive axel and/or other components of a drivetrain of the vehicle if not disengaged. As another example, the vehicle may be switched between operating the four wheel drive mode and the two wheel drive mode.

At 1106, method 1100 determines if the coupling mechanism is in the disengaged state. If the coupling mechanism is in the disengaged state (e.g., the screw is loosened), method 1100 proceeds to 1108. If at 1106, method 1100 determines that the coupling mechanism is not in the disengaged state, method 1100 proceeds to 1112 and includes loosening the screw of the coupling mechanism. Loosening the screw may include rotating the screw in a counter-clockwise direction. The screw may be loosened until an axially inner surface of the block of the coupling mechanism is in face sharing contact with an axially outer surface of the coupler of the coupling mechanism. In one embodiment, the user may loosen the screw by hand without the use of the hand tool. In an alternate embodiment, the screw may additionally or alternatively be the screw loosened by use of a hand tool such as a wrench or screwdriver. In an additional embodiment, the screw may be loosened automatically by the actuator directed by the controller of the vehicle. Step 1112 proceeds to step 1114.

The technical effect of method 1100 is that a coupling mechanism as described above may be used to allow a user or technician to couple or decouple a wheel of a vehicle from a drive shaft. The components of the coupling mechanism may be positioned on a wheel side of the drive shaft allowing the vehicle operator or technician to access the coupling mechanism without demanding specialized tools or disassembly of the vehicle. Additionally, if maintenance or replacement is demanded, the coupling mechanism may be easily removed from a wheel side of the vehicle. Further, the coupling mechanism may be compatible with a plurality of different driveline configurations and gear boxes. In this way, wheels of the vehicle may be readily coupled or decoupled from the drive shaft according to the needs of the present operation.

The disclosure also provides support for a coupling mechanism of a wheel comprising: a screw with a threaded portion, a block with an internal threaded portion engaging the threaded portion of the screw, and a coupler mechanically coupled to the screw, where the coupler has a radially inner surface configured to couple with a drive shaft and a radially outer surface configured to couple with a spindle, where the screw is configured to engage the coupler with the drive shaft when actuated in a first direction and disengage the coupler from the drive shaft when actuated in a second direction, opposite the first. In a first example of the system, the coupling mechanism further comprises a cap covering a head of the screw. In a second example of the system, optionally including the first example, the radially inner surface of the coupler includes splines configured to engage with splines on a radially outer surface of the drive shaft. In a third example of the system, optionally including one or both of the first and second examples, the radially outer surface of the coupler includes outer coupler splines and a radially inner surface of the spindle includes inner spindle splines, the outer coupler splines configured to engage the inner spindle splines. In a fourth example of the system, optionally including one or more or each of the first through third examples, the radially outer surface of the coupler includes positive lobes and a radially inner surface of the spindle includes negative lobes, the positive lobes configured to engage the negative lobes. In a fifth example of the system, optionally including one or more or each of the first through fourth examples, the block includes a cavity configured to contain grease. In a sixth example of the system, optionally including one or more or each of the first through fifth examples, the radially outer surface of the coupler is configured to couple with a radially inner surface of the spindle while the coupler is actuated in the first and second directions.

The disclosure also provides support for a wheel of a vehicle comprising: a hub positioned at a radial center of the wheel, a coupling mechanism including a spindle coupled to the hub, a coupler and a block, the coupler and the block circumferentially surrounded by the spindle, wherein the spindle and the wheel rotate in unison, the coupler configured to move axially along a radially inner surface of the spindle between an engaged state of the coupling mechanism and a disengaged state of the coupling mechanism, wherein the radially inner surface of the coupler circumferentially surrounds a radially outer surface of a drive shaft in the engaged state and the coupler is not in contact with the drive shaft in the disengaged state, and the block configured to engage a pin, the pin coupled at an axially inner end to the coupler and an axially outer end of the pin protruding from an axially outer surface of the spindle. In a first example of the system, the block is positioned at an axially outer end of the spindle. In a second example of the system, optionally including the first example, the coupling mechanism further includes a helical spring positioned axially between the block and the coupler. In a third example of the system, optionally including one or both of the first and second examples, the helical spring is compressed when the coupling mechanism is in the disengaged state and the helical spring is extended when the coupling mechanism is in the engaged state. In a fourth example of the system, optionally including one or more or each of the first through third examples, the spindle includes shaft ball bearings, positioned radially between the spindle and the drive shaft, and circumferentially surrounding and supporting the drive shaft. In a fifth example of the system, optionally including one or more or each of the first through fourth examples, axial movement of the pin results in corresponding axial movement of the coupler. In a sixth example of the system, optionally including one or more or each of the first through fifth examples, the block remains stationary when the coupling mechanism moves between the engaged state to the disengaged state.

The disclosure also provides support for a method for operating a coupling mechanism of a wheel, comprising: disengaging the coupling mechanism from a drive shaft by loosening a screw of the coupling mechanism to move the coupling mechanism from an engaged state to a disengaged state, and engaging the coupling mechanism to the drive shaft by tightening the screw of the coupling mechanism to move the coupling mechanism from the disengaged state to the engaged state. In a first example of the method, a head of the screw is positioned at an axially outer surface of the wheel. In a second example of the method, optionally including the first example, loosening the screw and tightening the screw is performed by hand, with or without a hand tool. In a third example of the method, optionally including one or both of the first and second examples, loosening the screw and tightening the screw is performed by an actuator. In a fourth example of the method, optionally including one or more or each of the first through third examples, the method further comprises removing a cap of the coupling mechanism before disengaging or engaging the wheel and replacing the cap after engaging or disengaging the wheel. In a fifth example of the method, optionally including one or more or each of the first through fourth examples, tightening the screw includes applying between 30 Nm to 40 Nm of torque to the screw.

Note that the example control and estimation routines included herein can be used with various vehicle system configurations. The control methods and routines disclosed herein may be stored as executable instructions in non-transitory memory and may be carried out by the control system including the controller in combination/with the various sensors, actuators, and other hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various hardware components in combination with the electronic controller.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. The subject matter of the present disclosure includes all novel and non-obvious combinations and subcombinations of the various systems and configurations, and other features, functions, and/or properties disclosed herein.

FIGS. 2-10B are shown to scale, although other relative dimensions may be used, if desired.

FIGS. 2-10B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example.

The invention claimed is:

1. A wheel of a vehicle comprising:
a hub positioned at a radial center of the wheel;
a coupling mechanism including a spindle coupled to the hub, a coupler and a block, the coupler and the block circumferentially surrounded by the spindle, wherein the spindle and the wheel rotate in unison;
the coupler configured to move axially along a radially inner surface of the spindle between an engaged state of the coupling mechanism and a disengaged state of the coupling mechanism, wherein the radially inner surface of the coupler circumferentially surrounds a radially outer surface of a drive shaft in the engaged state and the coupler is not in contact with the drive shaft in the disengaged state; and
the block configured to engage a pin, the pin coupled at an axially inner end to the coupler and an axially outer end of the pin protruding from an axially outer surface of the spindle.

2. The wheel of claim 1, wherein the block is positioned at an axially outer end of the spindle.

3. The wheel of claim 1, wherein the coupling mechanism further includes a helical spring positioned axially between the block and the coupler.

4. The wheel of claim 3, wherein the helical spring is compressed when the coupling mechanism is in the disengaged state and the helical spring is extended when the coupling mechanism is in the engaged state.

5. The wheel of claim 1, wherein the spindle includes shaft ball bearings, positioned radially between the spindle and the drive shaft, and circumferentially surrounding and supporting the drive shaft.

6. The wheel of claim 1, wherein axial movement of the pin results in corresponding axial movement of the coupler.

7. The wheel of claim 1, wherein the block remains stationary when the coupling mechanism moves between the engaged state and the disengaged state.

* * * * *